(12) United States Patent
Kuo et al.

(10) Patent No.: US 6,329,628 B1
(45) Date of Patent: Dec. 11, 2001

(54) METHODS AND APPARATUS FOR GENERATING A PLASMA TORCH

(75) Inventors: Spencer P. Kuo, River Edge, NJ (US); Edward Koretzky, Rancho Palos Verdes, CA (US); Lester Orlick, Wantagh, NY (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 09/458,618

(22) Filed: Dec. 10, 1999

Related U.S. Application Data
(60) Provisional application No. 60/111,687, filed on Dec. 10, 1998.

(51) Int. Cl.[7] .................................................... B23K 9/00
(52) U.S. Cl. .................... 219/121.54; 219/121.47
(58) Field of Search ...................... 219/121.54, 121.57, 219/121.36, 121.48, 121.47, 121.5, 121.52, 121.44, 121.51; 427/577; 315/111.21; 75/10.19

(56) References Cited

U.S. PATENT DOCUMENTS

| | | | |
|---|---|---|---|
| 4,275,287 | * | 6/1981 | Hiratake ........................ 219/121.52 |
| 4,990,739 | * | 2/1991 | Zaplatynsky ................... 219/121.47 |
| 5,036,176 | * | 7/1991 | Yamaguchi et al. ............ 219/121.44 |
| 5,144,110 | * | 9/1992 | Marantz et al. ................ 219/121.48 |
| 5,147,998 | * | 9/1992 | Tsantrizos et al. .............. 219/121.5 |
| 5,220,150 | * | 6/1993 | Pfender et al. ................ 219/121.51 |
| 5,538,765 | * | 7/1996 | Kurihara et al. ..................... 427/577 |
| 5,938,950 | * | 8/1999 | Gay et al. ....................... 219/121.54 |
| 6,163,009 | * | 12/2000 | Hardwick et al. ............. 219/121.54 |

* cited by examiner

Primary Examiner—Teresa Walberg
Assistant Examiner—Quang Van
(74) Attorney, Agent, or Firm—Straub & Pokotylo; John C. Pokotylo

(57) ABSTRACT

A modular system for constructing an atmospheric pressure plasma source. A plasma torch module may be constructed by reassembling the structural components of two (2) different models of spark plugs. Each module can produce a plasma torch having a radius of about 1 cm or more, a height of about 6 cm, and a peak density exceeding $10^{13}$ cm$^{-3}$. A set of modules, each connected in series, may be used with a ballasting capacitor such that an array can be operated while sharing a common power supply to produce a plasma having a relatively large volume and a relatively high density. A system having a number of plasma torch modules may be used in applications for absorbing radiation, reducing air drag and igniting fuel.

42 Claims, 15 Drawing Sheets

FIG. 2A
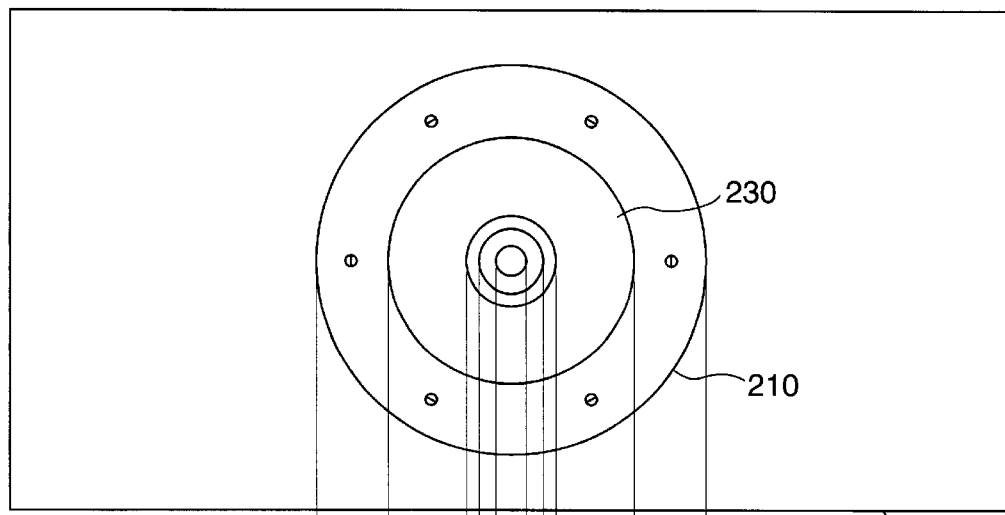
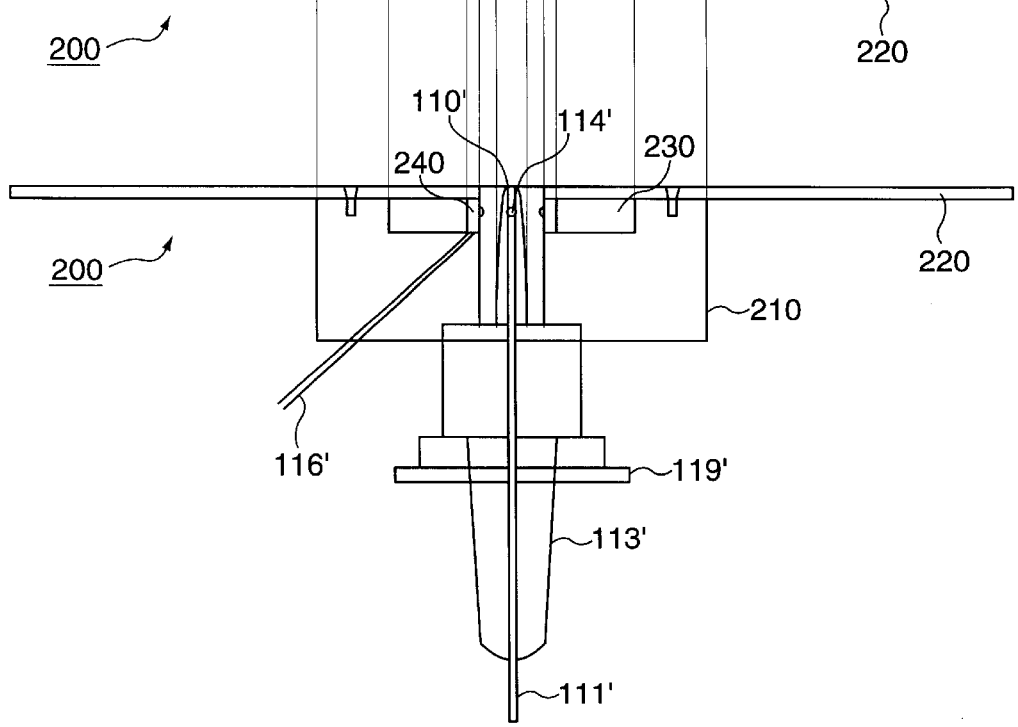
FIG. 2B

Parameter Values of the Electrodes and the Operating Gases

| | |
|---|---|
| Feed-Gas | Nitrogen/Dry Air |
| Flow Rate | 35 SCFH |
| Gas Velocity | 20 m/s |
| Diameter of Anode | 3/32 in. (0.2381 cm) |
| Anode Material | Tungsten (2% Thoriated) |
| Inner Diameter of Cathode | 6 mm |
| Outer Diameter of Cathode | 12 mm |
| Cathode Material | Steel Alloyed |
| Annular Gap | 0.1810 cm |

SUMMARY OF POWER MEASUREMENTS

|  | Power Factor | Wall Power (W) | Torch Power (W) |
|---|---|---|---|
| Single Torch (no Cap.) | 0.25 | 730 | 230 |
| Single Torch (Cap.) | 0.62 | 900 | 320 |
| Two Coupled Torches | 0.96 | 1860/2 | 350 |

METHODS AND APPARATUS FOR GENERATING A PLASMA TORCH

§ 0. RELATED APPLICATIONS

Benefit is claimed, under 35 U.S.C. § 119(e)(1), to the filing date of provisional patent application serial number 60/111,687, entitled "A MODULAR PLASMA TORCH", filed on Dec. 10, 1998 and listing Spencer P. Kuo, Edward Koretzky and Lester Orlick as inventors, for any inventions disclosed in the manner provided by 35 U.S.C. § 112, ¶ 1. This provisional application is expressly incorporated herein by reference.

§ 1. BACKGROUND OF THE INVENTION

§ 1.1 Field of the Invention

The present invention concerns methods and apparatus for generating a plasma torch. More specifically, the present invention concerns a module for generating a plasma torch and a system, using an array of such modules, for generating a plasma torch. In addition, the present invention also concerns applications for the plasma torch module and the plasma torch generation system.

§ 1.2 Related Art

The present invention relates generally to atmospheric pressure plasma generation devices (or "plasma sources"). Atmospheric pressure plasma sources do not need vacuum systems in their setups. They can have open structures, thereby allowing plasma to be exposed directly to the open air. An atmospheric plasma source may be used for reflecting or absorbing microwave radiation (See, e.g., the article: R. J. Vidmar, "On the Use of Atmospheric Pressure Plasmas as Electromagnetic Reflectors and Absorbers," *IEEE Trans. Plasma Sci.*, Vol. 18, pp. 733–741 (August 1990), hereafter referred to as "the Vidmar article".), processing materials (See, e.g., the article: M. I. Boulos, "Thermal Plasma Processing," *IEEE Trans. Plasma Sci.*, Vol. 19, pp. 1078–1089 (December 1991), hereafter referred to as "the Boulos article".), sterilizing (See, e.g., the articles: K. Kelly et al., "Room Temperature Sterilization of Surfaces and Fabrics with a One Atmosphere Uniform Glow Discharge Plasma," *Journal of Industrial Microbiol Biotechnology*, Vol. 20, pp. 69–74 (1998), hereafter referred to as "the Kelly article"; and E. Garate et al., "Atmospheric Plasma Induced Sterilization and Chemical Neutralization," *IEEE Int. Conf. Plasma Sci.*, Vol. 98CH36221, p. 183 (1998), hereafter referred to as "the Garate article".), and neutralizing chemicals (See, e.g., the Garate article). Most of these applications require the plasma to be dense and have a large volume.

Using AC or DC glow discharges to produce atmospheric pressure plasmas generally results in low densities (e.g., less than or equal to $10^{11}$ electrons/cm$^3$) and a small volume. (See, e.g., the article: J. R. Roth, "*Industrial Plasma Engineering*—Vol. 1, Briston: Principles Institute of Physics (1995), hereafter referred to as "the Roth article".) Although the volume of the plasma can be increased by using microwave (See, e.g., the article J. E. Brandenburg et al., "Experimental Investigation of Large Volume PIA Plasmas at Atmospheric Pressure," *IEEE Trans. Plasma Sci.*, Vol. 26, pp. 145–149 (April 1998), hereafter referred to as "the Brandenburg article".) or photon ionization processes, the plasma density is still low.

Operation of a discharge in the high current, diffused are, mode can be achieved by introducing gas flow in the discharge to form a plasma torch. (See, e.g., the article: T. B. Reed, "Induction-coupled Plasma Torch", *J. Appl. Phys.*, Vol. 32, No. 5, pp. 821–824 (1961), hereafter referred to as "the Reed article".) The inertia of the gas flow carries the plasma to give a longer discharge current path without significantly affecting the electric field distribution between the electrodes.

The discharge can be either a high frequency inductive (See, e.g., the article: M. I. Boulos, "Thermal Plasma Processing," *Pure Appl. Chem.*, Vol. 57, No. 9, pp. 1321–1357 (1985) hereafter referred to as "the second Boulos article".) or low frequency capacitive (See, e.g., the article: E. Koretzky et al, "Characterization of an Atmospheric Pressure Plasma Generated by a Plasma Torch Array," *Phys. Plasmas*, Vol. 5, No. 10, pp. 3774–3780 (1998), hereafter referred to as "the Koretzky article".). The inductive torch has the feature of being electrode-less, but a high current power supply is used to induce a large electric field in the gas for its breakdown. Consequently, the structure of an inductive torch is relatively large and is therefore unsuitable for certain applications. On the other hand, the capacitive torch employs a pair of electrodes to apply the high voltage, provided directly by the power supply, to the gas for a discharge. A power transformer can easily step up the voltage to the required level. This difference in the discharge field distributions (i.e., localized near the electrodes versus that distributed along the coil) causes the operating temperature of the capacitive torch to be much lower than that of the inductive torch. (See, e.g., the article S. P. Kuo et al, "Temperature Measurement of an Atmospheric Pressure Plasma Torch," *Rev. Sci. Instrum.*, Vol. 70, No. 7 (1999), hereafter referred to as "the Kuo article".)

In view of the foregoing deficiencies of known plasma torches, there is a need for a plasma source that can be used independently, or with other sources to produce a relative dense plasma having a relatively large volume. Such plasma sources should be easily replaceable and serviceable. Finally, such a plasma source should be relatively easy and fast to start.

§ 2. SUMMARY OF THE INVENTION

The present invention meets the aforementioned goals by providing a capacitive plasma torch employing a pair of electrodes to apply a high voltage, supplied directly from a power supply, for a discharge. Its compact size (e.g., the size of a standard motor vehicle's spark plug) permits it to be used in many applications where a relatively small size is desired or required.

The plasma torch of the present invention may be constructed using components from available spark plugs. In one embodiment, each plasma torch module can produce a torch plasma having a radius of about 1 cm and larger and a height of about 6 cm, and a peak density exceeding $10^{13}$ electrons/cm$^3$. The plasma source can easily start the generation of a plasma source quickly.

The plasma torch of the present invention can be easily mounted on a plate, which may or may not have a curvature. Thus, the plasma torch of the present invention can be arranged in an array, for example. In this way, a set of modules, each connected in series, with a ballasting capacitor in the circuit, can be operated as an array sharing a common power source to produce a dense and large volume plasma.

The present invention is attractive in that its electrical circuitry is simple and is adaptable to a number of AC power sources, such as 60 Hz voltage available at most common wall outlets.

By providing a plasma torch module having the size of a spark plug and in the form of a modular unit, which can be installed onto (e.g., screwed into) the surface (e.g., grounded) of an object as an array, the shape of the base surface of the array can be easily adjusted for each specific application. Further, by using the module as a building block, the design of large volume plasma sources is simplified.

§ 3. BRIEF DESCRIPTION OF THE DRAWINGS

FIGS. 2A and 2B are plan and partial cross-sectional side views, respectively, of another embodiment of a plasma torch module made in accordance with the present invention.

§ 4. DETAILED DESCRIPTION

The present invention involves novel methods and apparatus for generating a plasma torch. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

In the following, functions which may be performed by the present invention are introduced in § 4.1. Then, structures of apparatus built in accordance with the present invention are described in § 4.2. Thereafter, operations of the apparatus are described in § 4.3. Finally, conclusions about the present invention are presented in § 4.4.

§ 4.1 FUNCTIONS OF THE INVENTION

The present invention may be used to generate a plasma torch having a relatively large size (e.g., at least 6 cm high and at least 1 cm wide) and a relatively high density (e.g., at least $10^{13}$ electrons/cm$^3$). The present invention may also be used to generate a plasma torch having enhanced strength and stability. The present invention may use one or more modular plasma torches in applications to absorb radiation (e.g., radar), reduce air drag and ignite fuel. Finally, the present invention may use two (or more) modular torches in a self-cleaning arrangement.

§ 4.2 STRUCTURES

In the following, a new capacitive plasma torch module is described in § 4.2.1. An improvement to the new capacitive plasma torch module is then described in § 4.2.2. Thereafter, systems with one or more of the plasma torch modules, described in § 4.2.1 or § 4.2.2, are described in § 4.2.3.

§ 4.2.1 Plasma Torch Module

Figure 1A:
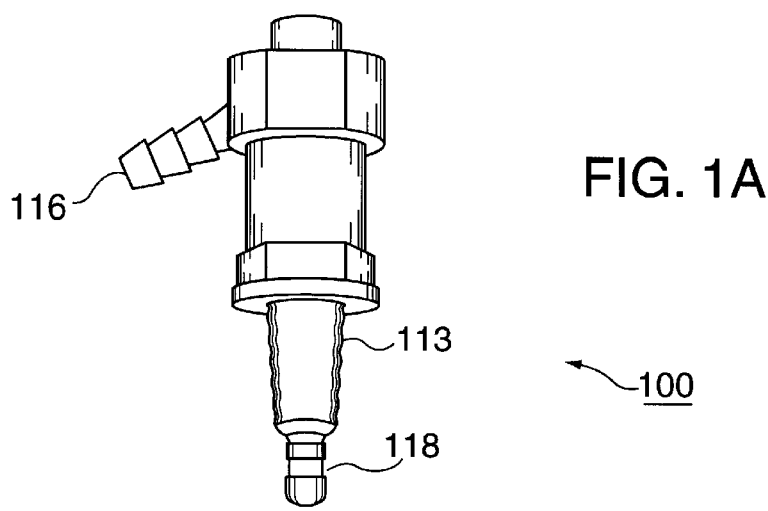
FIGS. 1A through 1C are side, plan, and partial cross-sectional side views, respectively, of a plasma torch module made in accordance with the present invention.
Figure 1B:
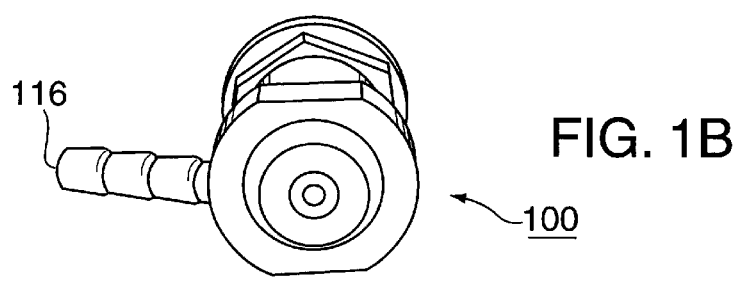

A new capacitive plasma torch is now described. As will be described with reference to FIGS. 1A through 1C, the electrodes 110,111 of the torch module 100 may be constructed from components of two commercially available spark plugs (e.g., a surface gap spark plug and a resistive spark plug) and a tungsten anode 111. Thus, the plasma torch module 100 has the size of a standard spark plug and is provided in the form of a modular unit which may be screwed into the grounded base surface of an array. The plasma torch module 100 can therefore be used as a building block in systems for generating a plasma torch having a large volume. Further, the maintenance of such systems is simplified.

A surface gap spark plug, which has a concentric electrode pair, is used as a frame for constructing the plasma torch module 100. For operation as a plasma torch, a gas flow between the electrodes is desired. However, the original electrode insulator fills the space between the cathode and the anode. Thus, to introduce the gas flow, an annular gas chamber 112 inside the base of the assembly is created by replacing the original electrode insulator with a new one 113, having a smaller outer diameter. This annular gas chamber 112 permits the introduction of a gas (e.g., air) flow to an area close to a gap defined by the electrodes 110, 111. The new electrode insulator 113 may be taken from a different spark plug. Further, the new electrode insulator 113 may be taken from a resistive type spark plug, which has a high-impedance (e.g., ~5 kΩ) anode. Thus, the central electrode (anode) of the spark plug set in the new insulator 113 may be replaced by a new anode 111, such as a solid 3/32 inch diameter tungsten wire for example. This new anode 111 may be held in place concentrically with the cathode 110 by the new insulator 113 and may be axially set by a set screw 117 arranged in the anode terminal post 118. Accordingly, the new anode ill is axially adjustable while retaining the standard terminal of the original spark plug.

Figure 1C:
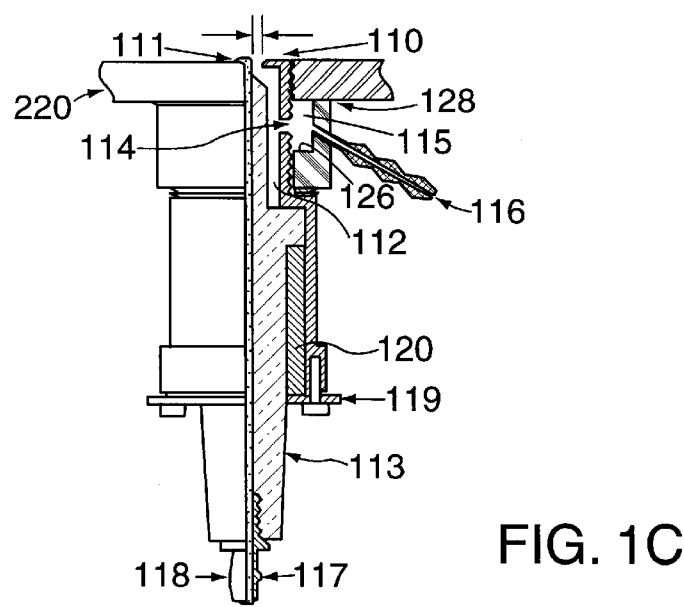

A number (e.g., four (4)) of holes 114 (only one of which is shown in FIG. 1C) are drilled through the base of the plug (e.g., through the cathode 110) to create a flow through the region between the electrodes. The holes 114 may be arranged in a spiral pattern to facilitate a swirling flow. Naturally, openings of other shapes, sizes and numbers may be used to allow the gas to be introduced. A gas plenum chamber 115 provided with a gas inlet tube 116 and defined by chamber wall 126 is provided around the base of the spark plug, surrounding the holes 114. Thus the holes 114 fluidly couple the gas plenum chamber 115 with the annular gas chamber 112.

Finally, as shown in FIG. 1C, a packing material 120, such as Teflon for example, may be provided between the insulator 113 and the cathode 110. A packing washer 119 may be provided around the insulator 113 and may be attached to the cathode 110. A sealing washer 128, formed of Teflon for example, may be provided around the cathode 110 and anode 111. As shown, the sealing washer 128 may define a portion of the plenum chamber 115.

Having described a structure of a first exemplary plasma torch module, a second plasma torch module will now be described in § 4.2.2 below. Then, systems using one or more plasma torch modules will be described in § 4.2.3 below.

§ 4.2.2 Improved Plasma Torch Module

FIGS. 2A and 2B are plan and side, partial cross-sectional views, respectively, of another embodiment of a plasma torch module 200 made in accordance with the present invention. As can be seen by comparing FIGS. 2A and 2B with FIGS. 1A through 1C, the second embodiment of the plasma torch module 200 may be similar to the first embodiment of the plasma torch module 100. However, the second embodiment of the plasma torch module 100 does not have the chamber wall 126 or the sealing washer 128. Instead, the cathode 110' of the plasma torch module 200 is attached to (e.g., screwed into) a plate 220. Further, an annular magnet 230 is provided around the cathode 110'. In one embodiment, the annular magnet may be a permanent magnet having an outside diameter of 2 3/16 inches, an inside diameter of 13/16 of an inch and a 0.421 inch thickness. Such a permanent magnet may be similar to those magnets found in audio speakers for example. The annular magnet 230 is accommodated by a body 210, such as an aluminum body for example, which is attached to the plate 220. Thus, in this embodiment, the annular magnet 230 is held axially by the plate 220 and the body 210 and is held radially by the body 210. An annular chamber 240 is defined between the cathode 110' and the annular magnet 230. A gas inlet 116' may be provided through the body 210 to the annular chamber 240. As was the case with the first embodiment of the plasma torch module 100, inlet holes 114' may be provided through the cathode 110 to fluidly couple the annular chamber 240 with an annular gas chamber (not shown, but similar to the one 112 of FIG. 1C). Further, as was the case with the first embodiment, an anode 111' may be separated from a cathode 110' by an insulator 113', and a packing washer 119' may be provided. Although a plate 220 and body 210 are provided for positioning the annular magnet 230 and defining an annular chamber, other means for positioning the annular magnet 230 and defining a chamber, which will be apparent to those skilled in the art, may be employed.

In this embodiment 200, a magnetic field is introduced by the annular magnet 230. This magnetic field rotates the discharge around the electrodes (in the azimuth direction). This magnetic field enhances the strength (e.g., density) and stability (e.g., of the shape) of a plasma torch produced by the plasma torch module.

Having described two embodiments of a plasma torch module in §§ 4.2.1 and 4.2.2 above, systems which use one or more plasma torch modules are now described in § 4.2.3 below.

§ 4.2.3 Systems with one or More Plasma Torch Modules

Figure 3:
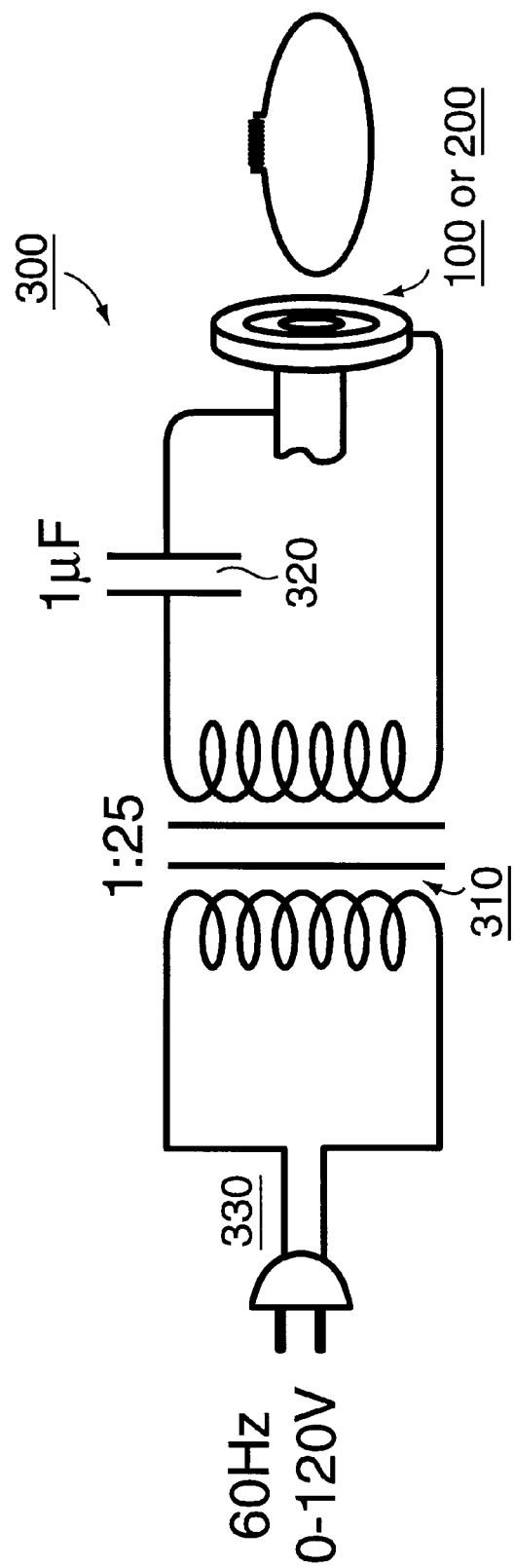
FIG. 3 is a schematic diagram of an electrical circuit including a plasma torch module.

FIG. 3 is a schematic diagram of an electrical circuit 300 including a plasma torch module 100 or 200. The circuit 300 may include a power transformer 310 to step up a line voltage. For example, the transformer 310 may have a turns ratio of 1:25 to step up a line 330 voltage of 120 V from a wall outlet to 3 kV. The circuit 300 may also include a capacitor 320 (e.g., 1 $\mu$F) in series with the electrodes of the torch module 100 or 200 for ballasting the electric discharge. This circuit 300 is described in the Koretzky article.

Figure 4:
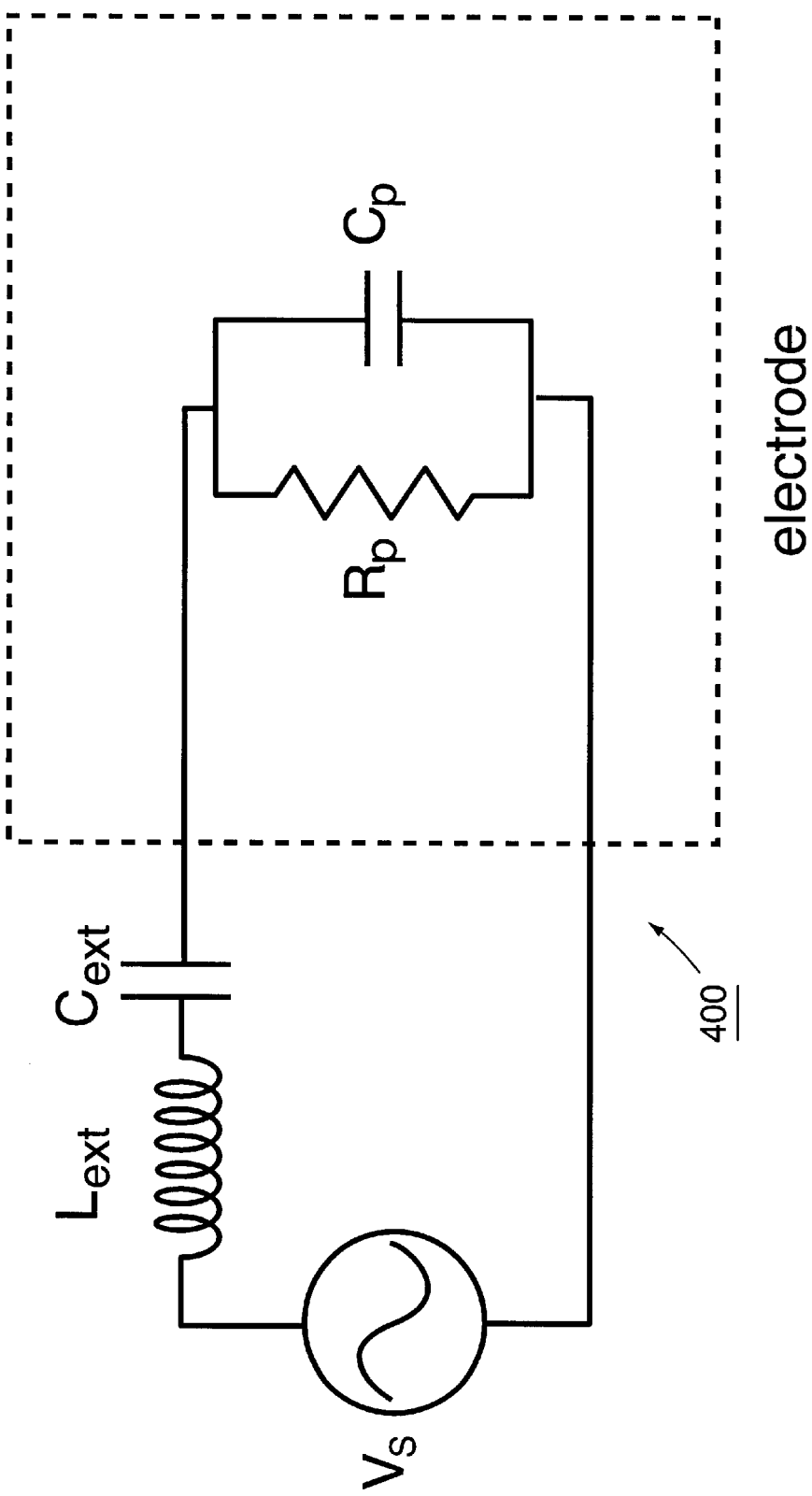
FIG. 4 is a schematic diagram of the electrical circuit of FIG. 3 and an equivalent circuit of the plasma torch module.

FIG. 4 is a schematic of the electrical circuit for a plasma torch module and its equivalent circuit. In the equivalent circuit, $R_p$ and $C_p$ are functions of the input voltage, in addition to the dimensions and the geometry of the electrodes. The time dependence of $R_p$ is represented by the measured voltage-current characteristic (which can be modeled, mathematically, by a function $v = C_1 \tanh \alpha_1 i - C_2 \tanh \alpha_2 i$, where $C_1$, $\alpha_1$, $C_2$ and $\alpha_2$ are chosen to fit a voltage-current curve). This equivalent circuit 400 has been justified by showing that the functional features of the experimentally measured voltage and current waveforms of the discharge can be reproduced quite well by numerical simulations. (See, e.g., the paper: E. Koretzky, "Atmospheric Pressure Plasma and Electron Cyclotron Resonance Plasma and their Applications," Ph.D. Dissertation, Polytechnic University, Brooklyn, N.Y. 11201 (January 1999), hereafter referred to as "the Koretzky paper".)

Figure 5:
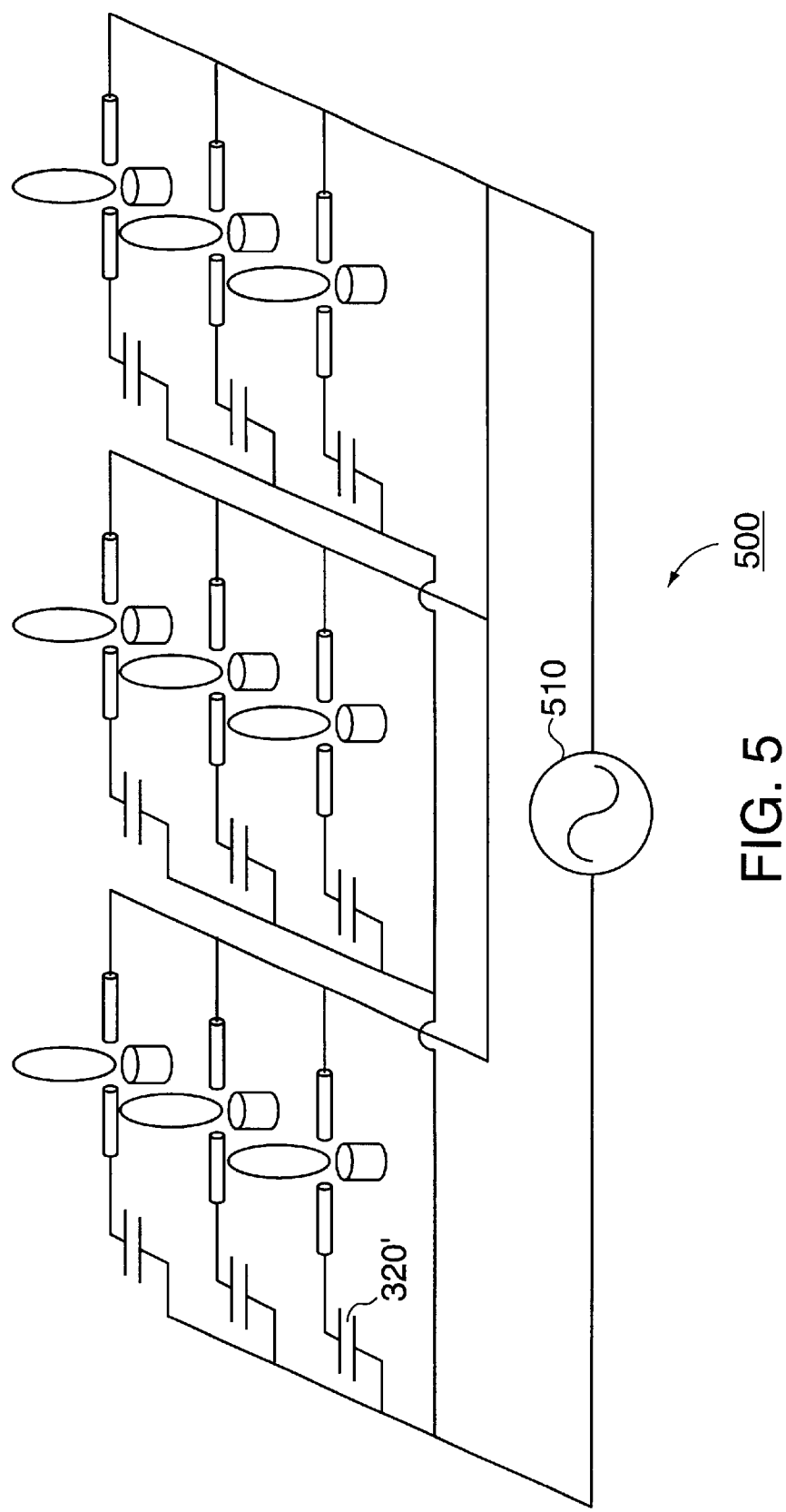
FIG. 5 is a schematic diagram of an array (3-by-3) of plasma torch modules sharing a common power source.

FIG. 5 is a schematic diagram of an array (3-by-3) 500 of plasma torch modules 100 or 200 sharing a common power source 510 The plasma torch modules 100 or 200 are coupled capacitively and can be fired simultaneously by the common power source 510.

Figure 6:
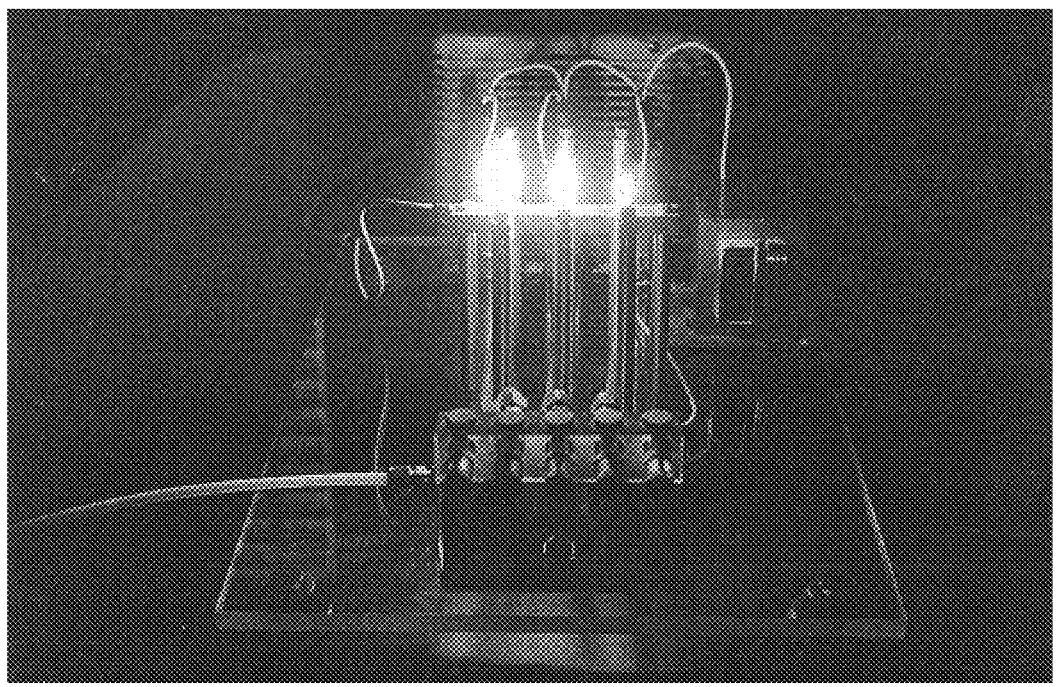
FIG. 6 illustrates the plasma produced by three (3) capacitively coupled plasma torch modules sharing a common power source.

FIG. 6 illustrates the plasma produced by three (3) capacitively coupled plasma torch modules 100. The dimensions of a single module's plasma may have a radius exceeding 1 cm and a height of about 6 cm. The height of the plasma torch may be controlled, at least to some extent, by controlling the rate at which the gas is introduced at the gas inlet 116. The radius of the plasma by the base region of a module may be about 0.65 cm, as determined by the radius of the ring cathode 110. However, the radius of the plasma expands quickly after the plasma is blown out of the module.

The operations of the systems described in this section will be described in § 4.3 below. First, however, a number of applications of these systems, as well as advantages of certain systems, are described in §§ 4.2.3.1 and 4.2.3.2 below.

§ 4.2.3.1 Applications of System

Figure 12:
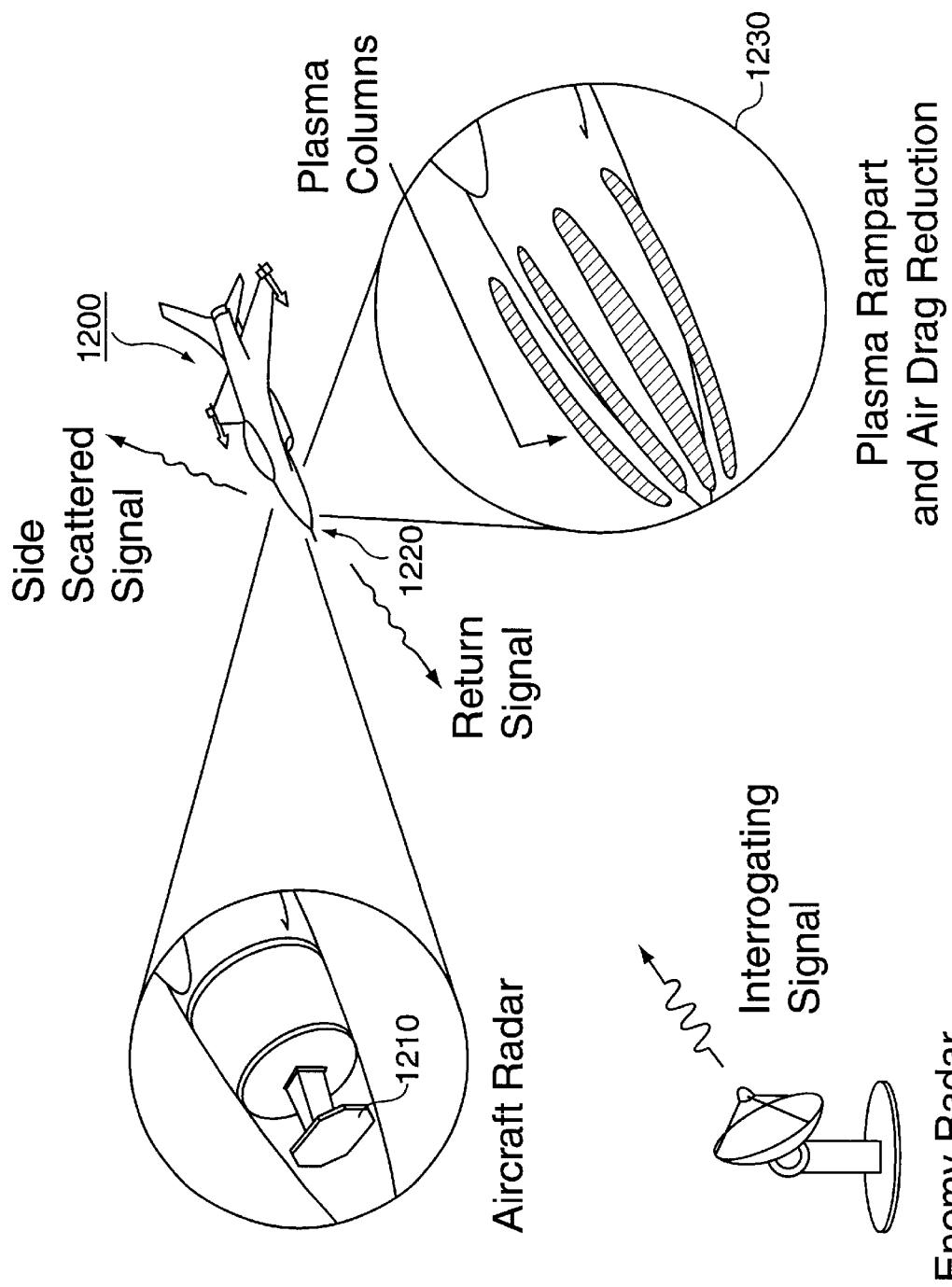
FIG. 12 illustrates two (2) potential applications of the present invention—one for cloaking radar and another for reducing air drag.

There are a number of potential applications for an arrangement of one or more plasma torch modules. As described in § 4.2.3.1.1 below, a system made in accordance with the present invention may be used to absorb radiation. As described in § 4.2.3.1.2 below, a system made in accordance with the present invention may be used to reduce air drag and to reduce or eliminate sonic booms. Finally, as described in § 4.2.3.1.3 below, a system made in accordance with the present invention may be used to ignite fuel. FIG. 12 illustrates two (2) of these applications—absorbing radiation for radar cloaking and reducing air drag—for an arrangement of one or more plasma torch modules. Both of these application may be applied to systems aboard an aircraft 1200, such as a military aircraft for example.

§ 4.2.3.1.1 Absorbing Radiation

Figure 13A:
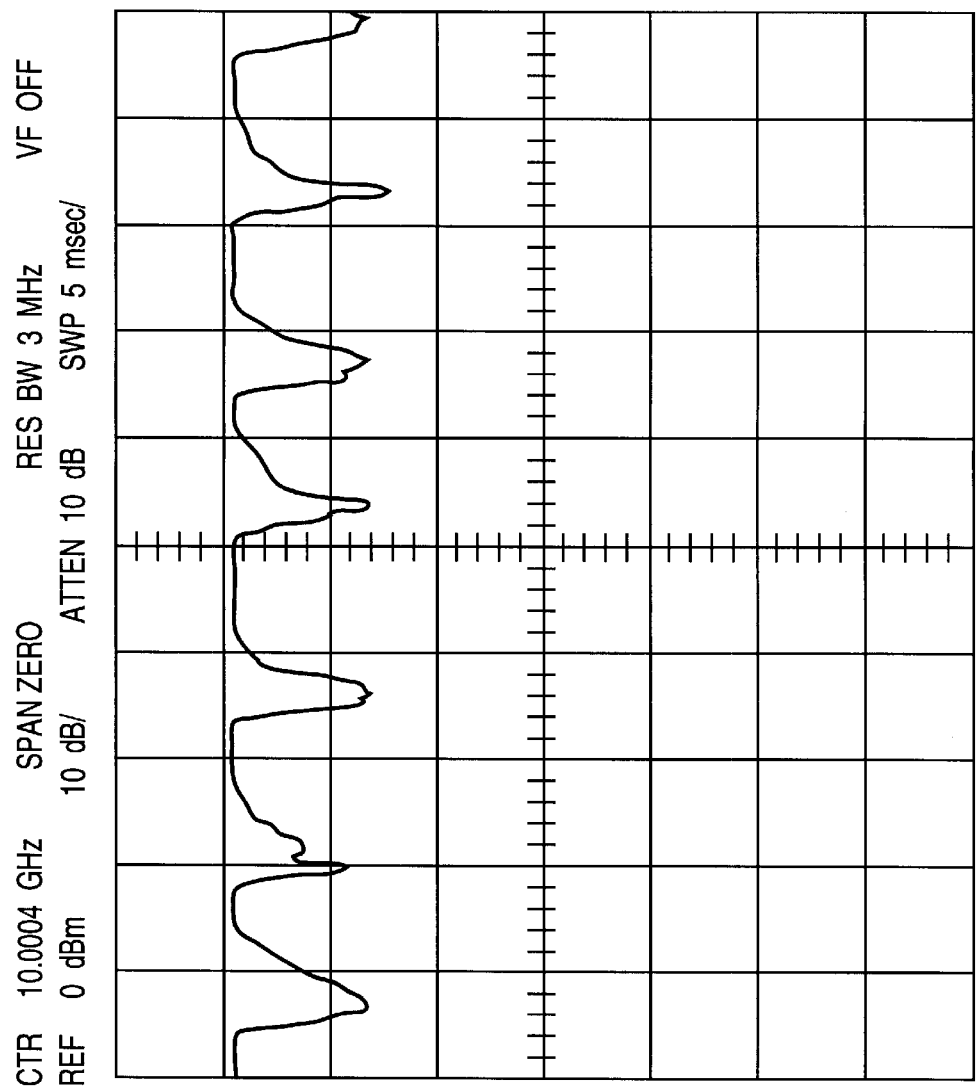
FIGS. 13A through 13C illustrate the attenuation of microwave radiation when one, two, and three plasma torches, respectively, are provided in the propagation path of the microwave radiation.
Figure 13B:
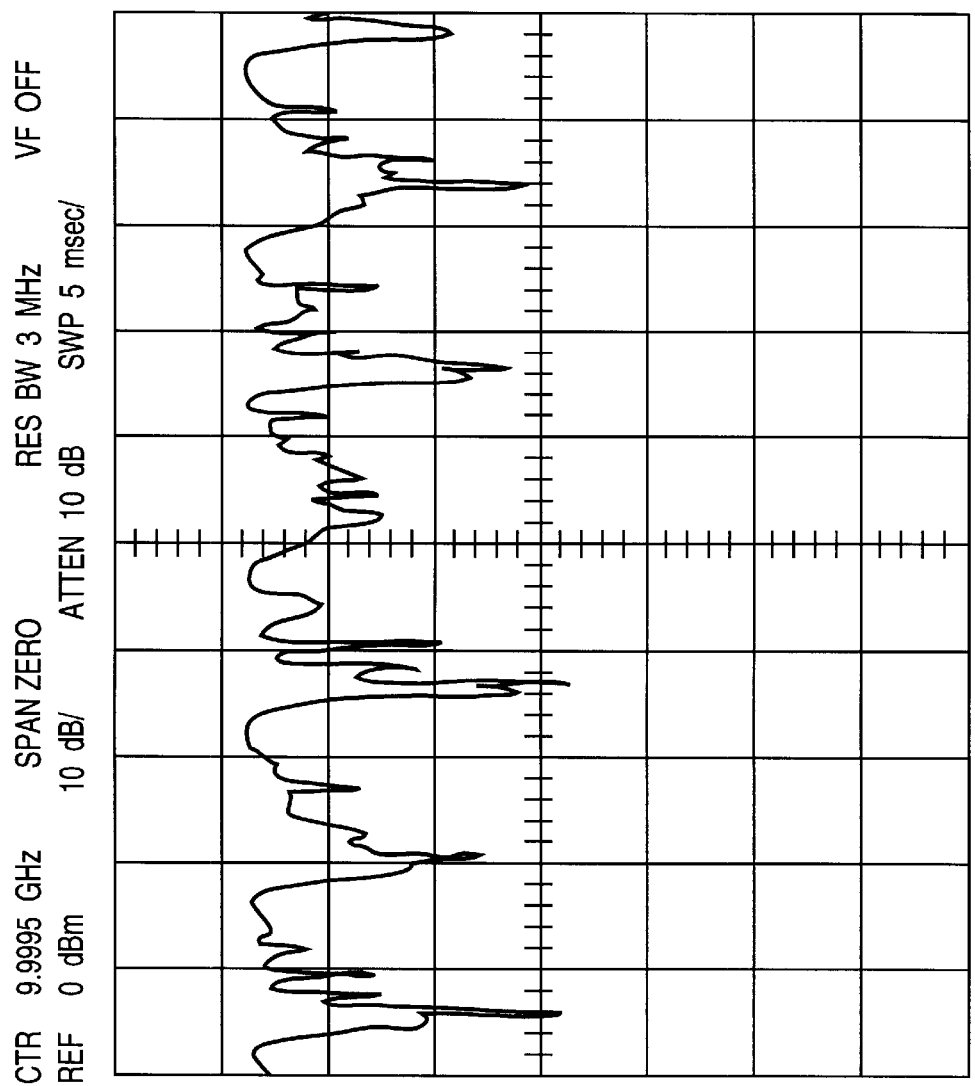
Figure 13C:
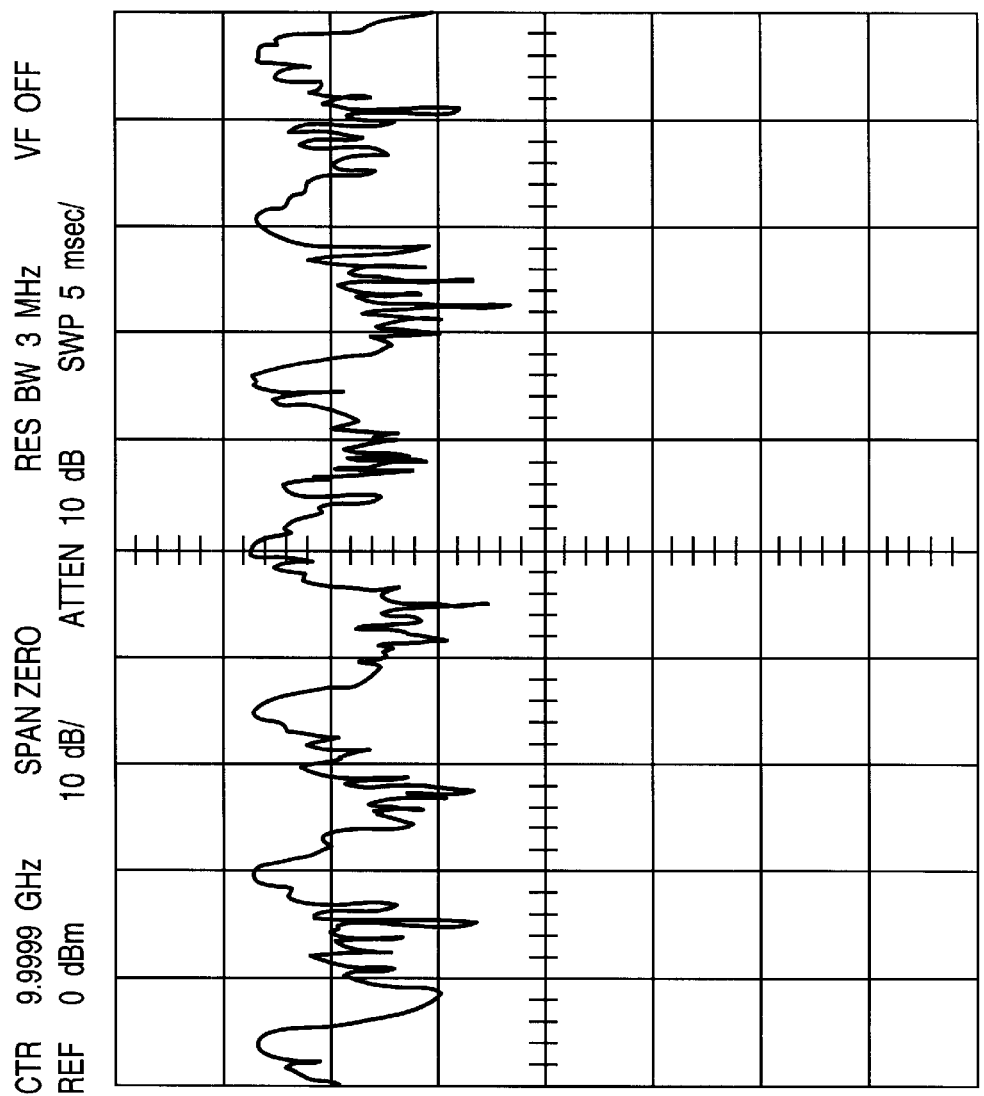

Air plasma can effectively absorb microwaves and the plasma torch can be turned on or off in microseconds. Thus, a plurality of plasma torch modules can be arranged on the surface of an aircraft 1200 for evading radar detection (also referred to as "cloaking"). For example, a plasma source made from an array of three (3) plasma torch modules 100 were used to study microwave absorption. (See, e.g., the article S. P. Kuo et al., "Design and Electrical Characteristics of a Modular Plasma Torch," *IEEE Trans. on Plasma Sci.*, Vol. 27, No. 3, pp. 752–758 (June 1999), hereafter referred to as "the new Kuo article".) Three (3) torch modules 100 were mounted on the bottom wall of a rectangular X-band waveguide (1 inch by 2 inches) such that the plasma produced crossed the path of propagation of a 10-GHz CW microwave and emerged out of the waveguide from the top wall through aligned holes. The signal received out the other end of the waveguide was monitored with a spectrum analyzer operating in the real-time mode. As shown in FIG. 13A, the maximum attenuation of the microwave by a single torch plasma exceeds 10 dB. As shown in FIG. 13B, the microwave attenuation doubles when two (2) torches are lit up. This is because the two (2) torches are lit up nearly simultaneously. However, when three (3) torches are lit up, there are time shifts among the on and off time of the torches. Consequently, the maximum attenuation of the microwave remains at about 20 dB when three (3) torches are lit. However, the duty cycle of the attenuation function is increased as is shown in FIG. 13C. The inventors have found that the time averaged microwave attenuation increases linearly with the number of torches.

Referring to FIG. 12, the nose 1220 of an aircraft 1200, such as a military aircraft for example, may be provided with a system having one or more plasma torch modules 100,200 to absorb radar. Furthermore, when a plane shaped to avoid radar detection deploys its antenna to transmit (or receive) information, it may become more susceptible to radar detection. Thus, a plasma torch may be provided while the antenna is being deployed (though not necessarily during transmission) to cloak the antenna.

§ 4.2.3.1.2 Redicing Drag and Reducing or Eliminating Sonic Boom

Plasma can be used to reduce drag, such as drag caused by shock waves for example. There are many reasons to reduce drag in supersonic and hypersonic flight. For example, from the standpoint of designing future high-speed vehicles, it is important to resolve the engineering trade-off between high volumetric efficiency and high fineness ratio (a ratio of engine thrust to external drag) shapes of high-speed vehicles. Extra cooling requirements for blunt bodies, due to extreme temperatures associated with shock wave formation on such bodies, lead to the usual tendency of choosing a very long slender fuselage in the design of supersonic vehicles.

Some have used plasma from the vaporization of metal wire to create a high pressure area to reduce air drag. However, such an approach is considered to be experimental and of not much practical use since once the metal wire is vaporized, it can no longer be used to generate more plasma torches. The present inventors have found that the plasma torch modules can be used to reduce air drag. Importantly, the present inventors have found that the plasma torch modules can be use to reduce or eliminate the shock wave that ordinarily occurs when a plane (or other body) flies at supersonic speeds.

Figure 14A:
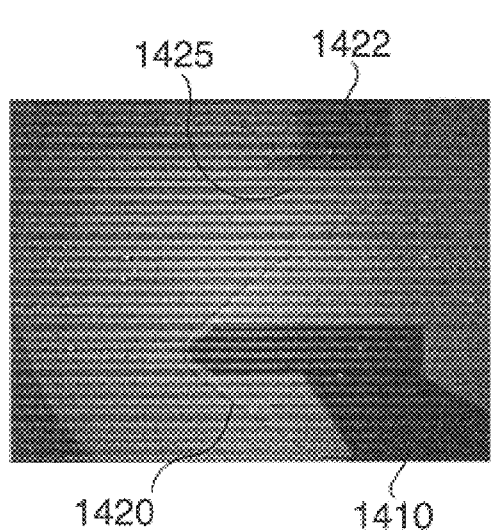
FIGS. 14A through 14D illustrate the reduction and/or elimination of a shock wave using a plasma torch.
Figure 14C:
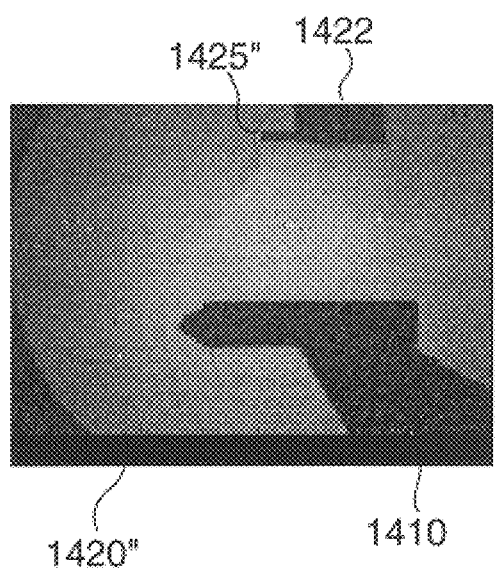
Figure 14B:
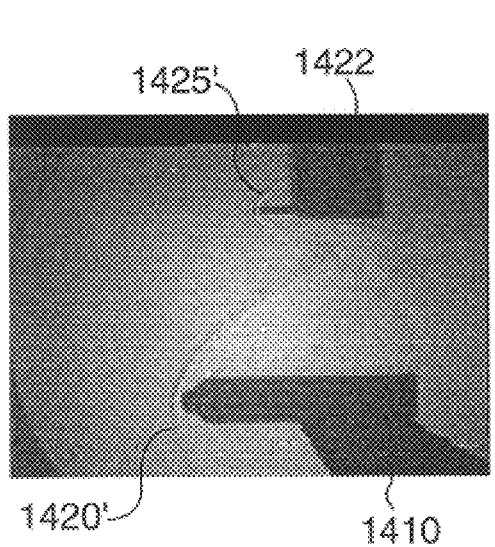
Figure 14D:
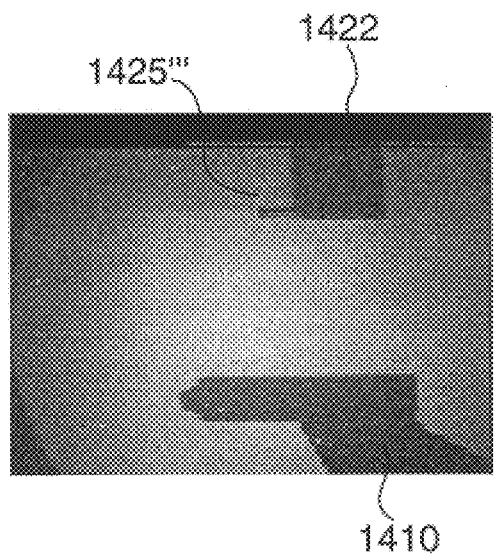

FIGS. 14A through 14D show a missile-shaped model 1410 placed in the test section of a Mach-2.5 wind tunnel. The plasma effect on an attached conical shock wave appearing at the front end of the model 1410 has been studied experimentally in a Mach-2.5 stream. The tip and the body of the model 1410 are designed as the cathode and anode, respectively, for gaseous discharge, and are separated by a conical-shaped ceramic insulator providing a 5-mm gap. The geometry of the tip helps to concentrate the electric flux density in the nearby region so that the applied electric field can extend considerably far into the upstream region. Thus, gaseous breakdown occurring locally produces a plasma which is spray-like moving around the tip as an effective extended spike of the model 1410. It is observed that the plasma has caused the shock front to separate from the model 1410. The shock wave 1420 moves upstream in the form of a detached bow shock a sensible distance away from the model 1410 tip. The detached shock front 1420' and 1420" appears to be highly dispersed in its new location as seen in the shadow video graphs of the flow as shown in FIGS. 14B and 14C, respectively. By a further increase of the discharge current, a complete annihilation of the shock wave has been achieved as shown in FIG. 14D. In FIGS. 14A through 14D, a pilot probe 1422 was used to introduce a reference shock wave 1425 and for sensing the flow condition.

The present inventors interpret these experimental results to suggest that a system employing one or more plasma torch modules may be used to significantly reduce the shock wave drag in supersonic and hypersonic flight. Thus, the sonic boom associated with supersonic air travel can be reduced or minimized. In this way, commercial planes, for example, capable of achieving supersonic speeds, might no longer need to be rerouted over sparsely populated, or unpopulated, areas during the subsonic to supersonic transition. Further, if the plasma torch systems of the present invention are used to reduce supersonic drag caused by a shock wave, it will result in reduced fuel consumption ultimately leading to smaller propulsion system requirements. Moreover, a high effective fineness ratio for high-speed vehicles may be achievable. Thus, a commercial advantage is possible in which larger payloads are possible at smaller take-off gross weights and sonic boom attenuation is possible during supersonic flight.

As shown in FIG. 12, the modular torches may be arranged around the nose 1220 of a plane 1200, for example, to reduce drag, such as wave drag for example, by weakening or eliminating shock waves associated with supersonic speeds. At high air speeds, the plasma will extend back from the nose 1220 of the plane 1200 as shown in the detail 1230.

§ 4.2.3.1.3 Igniting Fuel

Finally, the plasma torch module of the present invention may be used to ignite fuel in the combustion chamber of an engine. For example, in the supersonic speed airplanes introduced above, fuel may often pass through the engine combustion chamber without being fully ignited. Thus, un-ignited fuel may be wasted as it forms a part of the engine's exhaust. By increasing the size, density, and firing speed of the plasma torch, the plasma torch module may be used to ignite fuel more quickly and completely, thereby minimizing wasted fuel and decreasing potentially polluting un-ignited fuel found in the engine's exhaust.

§ 4.2.3.2 Advantages of System (SELF CLEANING)

The present inventors have found that when two (2) plasma torch modules are operated together in a system, the plasma torch modules exhibit a self-cleaning characteristic. That is, dark deposits, which are typically left on the electrodes, are not found when two (2) plasma torch modules are operated together in a system. The inventors suspect that this self-cleaning characteristic is due to current spikes occurring when the two (2) plasma torches are operated by a common supply circuit (described in § 4.3.4 below), though with opposing polarities. Thus, this self-cleaning characteristic is apparently independent of the spatial relationship between the two (2) plasma torches.

Having described the structures of two (2) embodiments of plasma torch modules, as well as systems using such plasma torch modules and applications thereof, the operations of the plasma torch modules and such systems are now described in § 4.3 below.

§ 4.3 OPERATIONS

The operations of the plasma torch modules described in §§ 4.2.1 and 4.2.2 above, are described in § 4.3.1 below. The operation of a plasma torch module using a circuit without a ballasting capacitor is then described in § 4.3.2 below. Thereafter, the operation of a plasma torch module using a circuit with a ballasting capacitor is described in § 4.3.3 below. Finally, the operation of two (2) plasma torch modules using a circuit with ballasting capacitors is described in § 4.3.4 below.

§ 4.3.1 Operation of Plasma Torch Module

Referring to FIG. 1C, gas, such as air for example, is introduced, under pressure for example, into the gap between the anode 111 and cathode 110 via the gas inlet 116, the plenum chamber 115, the holes 114 and the THi annular gas chamber 112. As the potential difference between the anode 111 and cathode 110 becomes large enough, an are is created between the electrodes 110,111 which ignites the gas. The gas passing through the are produces a diffused are. Similarly, referring to FIG. 2B, gas, such as air for example, is introduced, under pressure for example, into the gap between the anode 111' and cathode 110' via the gas inlet 116', the annular chamber 240 (defined by the magnet 230, the plate 220 and the body 210), the holes 114' and the annular gas chamber (not shown). As the potential difference between the anode 111' and cathode 110' becomes large enough, an are is created between the electrodes 110,111 which ignites the gas. The gas passing through the are produces a diffused are.

§ 4.3.2 Operation of Plasma Torch Module With Circuit Without Ballasting Capacitor A single torch module can be operated without including a ballasting capacitor in the circuit. However, a capacitor connected to each torch module is necessary to simultaneously light up all the torches in an array, when driven by a single power source. Otherwise, only one torch can be lit up in the array. The electrical characteristics of a torch module were investigated by measuring the voltage across its electrodes, the current through the electrodes, and the output voltage and output current of the transformer.

Figure 7A:
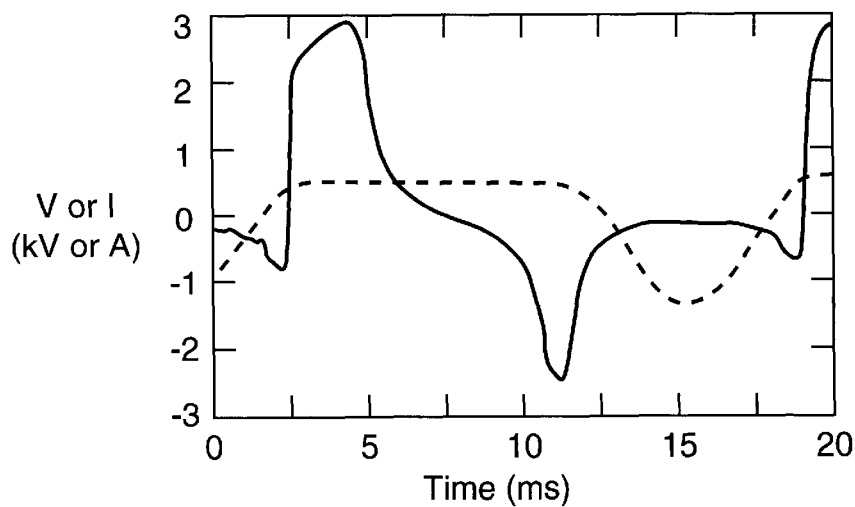
FIGS. 7A and 7B are current and voltage waveforms, and voltage-current characteristic, respectively, of a single plasma torch module powered by a circuit without a ballasting capacitor.
Figure 7B:
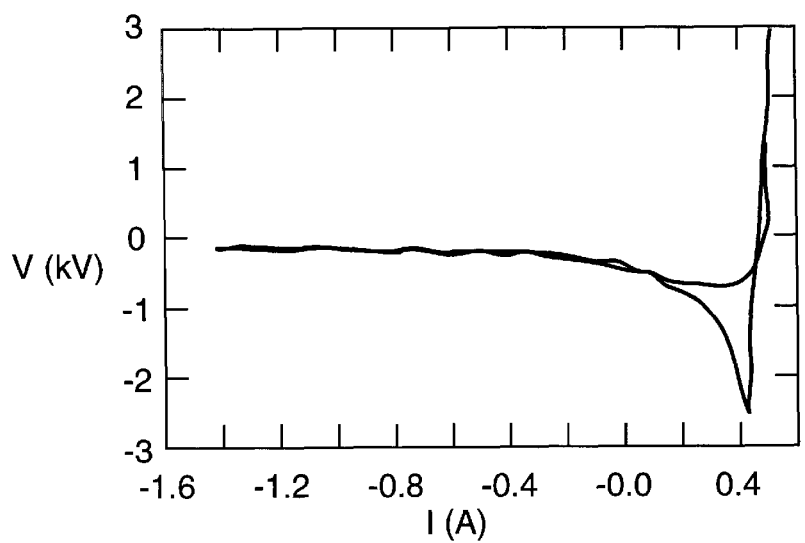

FIG. 7A is a plot of the voltage and current of the discharge of a single torch module without a ballasting capacitor. The electrical circuit of the system is similar to that depicted in FIG. 3 except that the capacitor 320 is removed. The results show that the discharge current is quite uniform during the first half cycle when the anode has a positive voltage. During the next half cycle, the voltage reverses polarity while the current still remains positive. The current becomes negative about when the voltage reaches the peak of the negative voltage cycle. The current reaches a negative peak while the magnitude of the voltage drops to a low value. An asymmetry between the discharges of the two half cycles is clearly shown. This asymmetry is believed to be the results of the asymmetry in the geometry of the electrodes. The anode has a much smaller cross-sectional area and much higher temperature than the ring cathode. Thus, the difference between the sheath potentials (electrode voltage drops) of the cathode and anode gives rise to a negative floating voltage. The small cross-sectional area of the anode also reduces the discharge current during the positive voltage cycle as shown in FIG. 7A. However, the current is quite uniform over a large period, even extending to cut off the negative voltage cycle. The voltage-current characteristic of the discharge is shown in FIG. 7B. This characteristic indicates that the high anode impedance keeps a glow discharge during the positive voltage cycle. The discharge, however, evolves to the diffuse are mode during the negative voltage cycle because of the low cathode impedance. During the transition from a glow discharge to an (diffused) are discharge, the module acts as a source. The inventors believe that this suggests that the module has a large effective capacitance in the torch, capable of maintaining a large floating voltage. Thus, the average power consumption of the torch is quite low and was determined to be about 230 W. The power supplied from the wall outlet in this case is measured to be 730 W. This suggests that there is a significant amount of power loss in the circuit (including the transformer having an internal resistance of 90 Ω and a Variac, which is an unnecessary component used only for convenience), which is also indicated by the low power factor of about 0.25. The power loss on the circuit can be further reduced through better design of the supply circuit.

Having described the operation characteristics of the plasma torch when used with a supply circuit without a ballasting capacitor, the operation characteristics of the plasma torch when used with a supply circuit having a ballasting capacitor is now described in § 4.3.3 below.

§ 4.3.3 Operation of Plasma Torch Module With Circuit With Ballasting Capacitor

Figure 8A:
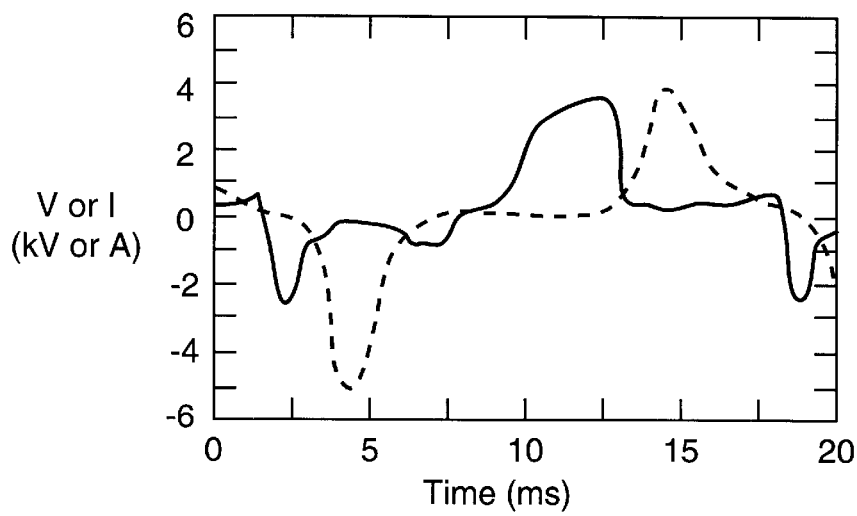
FIGS. 8A, 8B and 8C are current and voltage waveforms, voltage-current characteristic, and a transformer output voltage waveform, respectively, of a single plasma torch module powered by a circuit using a ballasting capacitor.

When a capacitor (Recall element 320 of FIG. 3.) is introduced into the circuit, the electrical characteristics of the discharge of a single torch module are changed significantly. As shown in FIG. 8A, the capacitor keeps the discharge symmetric between positive and negative voltage cycles. The capacitor also increases the peak discharge current during the positive voltage cycle so that the discharge is always evolved into the diffuse are mode as indicated by the voltage-current characteristic shown in FIG. 8B. Referring to the equivalent circuit of FIG. 4, the series capacitance reduces the total capacitance of the circuit.

Figure 8B:
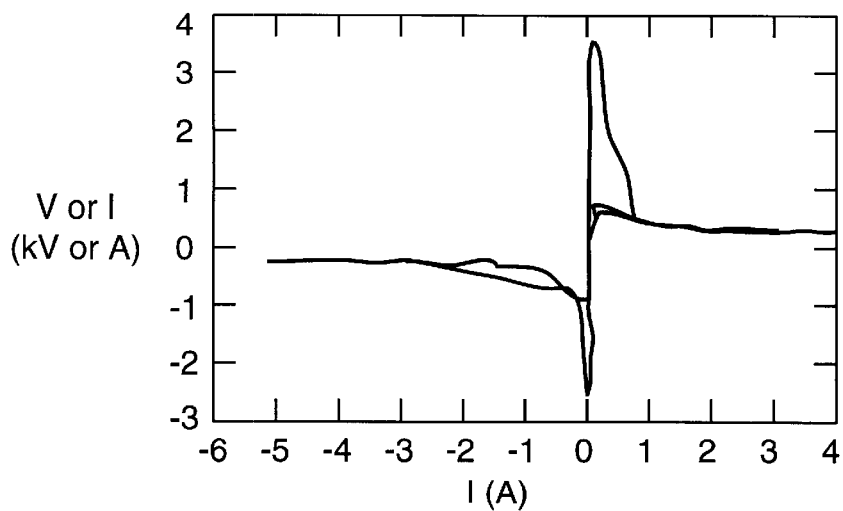

The difference in the areas of the closed loops of the two (2) half cycles shown in FIG. 8B also suggests that the energy stored in the capacitor during the positive voltage cycle is larger than that during the negative voltage cycle. It explains how the capacitor compensates for the geometrical asymmetry of the electrodes and keeps the discharge symmetrical. The hysteresis is also believed to be partly due to heating, which changes the conductivity of the plasma and has a time delay from the variation of the discharge current (at 120 Hz).

Figure 8C:
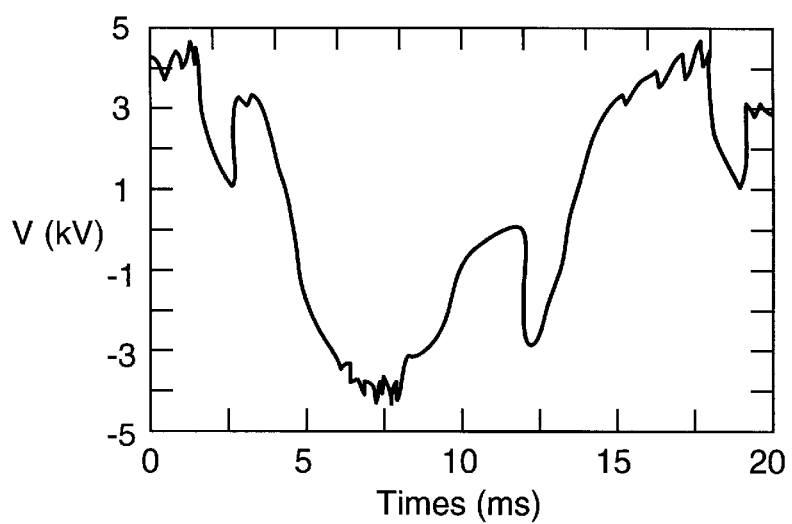

Providing the circuit with the capacitor helps to improve the power factor seen by the wall output (0.62 compared with 0.25 without the capacitor) and increases the average input power from 730 W to 900 W. The average power consumption of a plasma torch module in this case also increases from 230 W to 320 W. The increased power consumption of the torch occurs because the series capacitor reduces the total capacitance and, thus, the time constant of the circuit, so that the discharges in both the positive and negative voltage cycles are in the diffuse are mode and have much higher peak currents. Consequently, the capacitor has introduced significant harmonic distortion to the power line. However, this is not a concern of the operation of the torch module for most applications. The output voltage of the transformer is shown in FIG. 8C. The difference between the voltage curve in FIG. 8A and By that of FIG. 8C is the voltage of the capacitor. It illustrates that the capacitor keeps most of the output voltage of the transformer. Since the voltage required to maintain an are discharge is much lower than that required to start the glow discharge, the input voltage of the power line can be reduced by up to 40% once the torch is lit up.

Having shown that the gas flow introduces a ballasting effect to prevent constriction of the arc, the electrical characteristics of two (2) plasma torch modules is now described in § 4.3.4.

§ 4.3.4 Operation of Two Plasma Torch Modules With Circuit With BalastinG Capacitor Based on the voltage-current characteristic of FIG. 7B, it can be seen that two (2) plasma torch modules can not be lit up simultaneously by a single power source unless a ballasting capacitor(s) is included in the circuit. Surprisingly, the electrical performance of the circuit with two (2) plasma torch modules is significantly improved. The power factor of the power line is improved to 0.96 and the total harmonic distortion is reduced to a very low percentage. The input power from the power line is roughly doubled from 900 W for a single plasma torch module (powered by a circuit having a ballasting capacitor) to 1860 W for two (2) capacitively coupled plasma torch modules. The coupling introduces oscillations in the discharge voltage of each plasma torch module. Consequently, the discharge current contains large amplitude spikes. Thus, the sum and difference of the discharge currents of two (2) plasma torch modules are recorded instead.

Figure 9A:
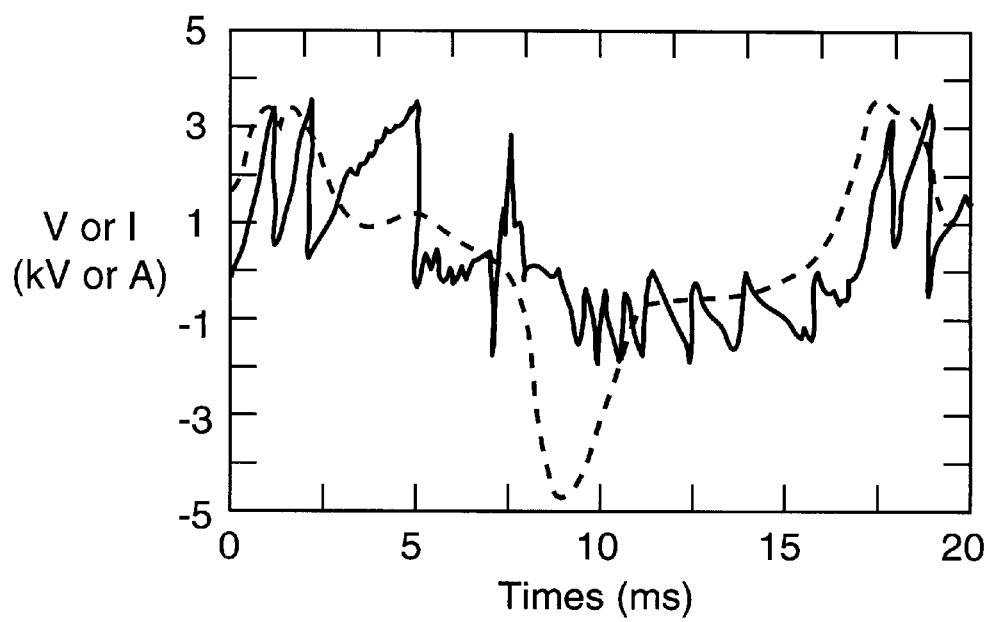
FIGS. 9A and 9B are current and voltage waveforms, and a current difference, respectively, of two (2) plasma torches powered by a circuit having a ballasting capacitor.
Figure 9B:
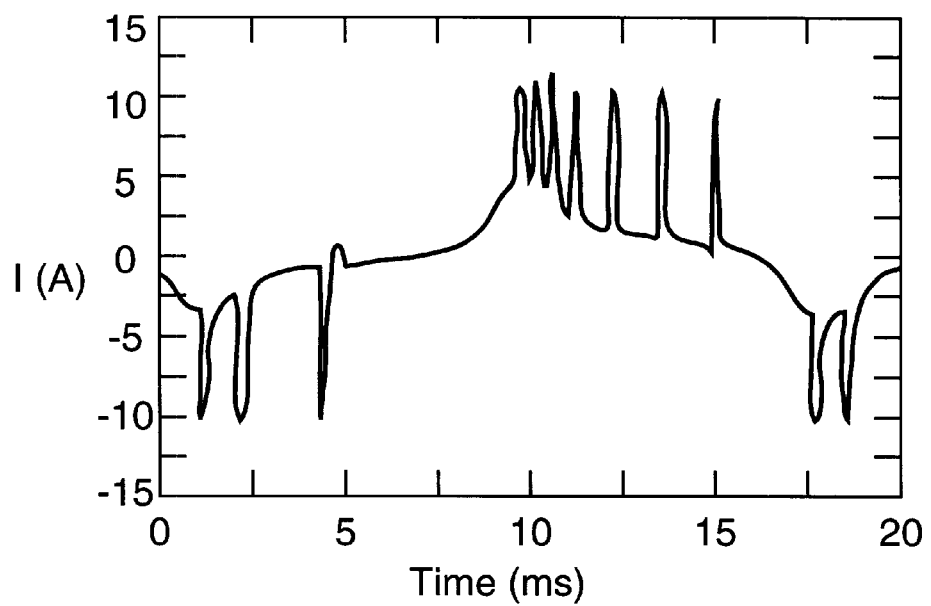

FIG. 9A shows the discharge voltage of one plasma torch module and the sum current of the two (2) plasma torch modules, which is also the output current of the transformer. The current is similar to that of a single torch. However, a quite different voltage measurement containing many discontinuous jumps is observed. The difference current of the two (2) plasma torch modules is shown in FIG. 9B. As can be seen, there is a current spike corresponding to each voltage jump. Since there are no spikes in the sum current shown in FIG. 9A, the inventors believe that this suggests that the spiking currents of the two (2) plasma torch modules flow in opposite directions. Moreover, the output current of the transformer shown in FIG. 10 (along with the output voltage) has no spikes. This suggests that these spiking currents are internal circulation currents supplied by the capacitors. That is, the capacitors work as additional dependent sources providing feedback control of the discharge voltage and current of each torch modules so that the system is operating at maximum power efficiency. The current spikes increase the peak plasma density and energy which can be confirmed visually by the color and intensity of the air glow and by the average power consumption of each torch increasing slightly to 350 W. However, the current spikes have a frequency spectrum extending into the audible frequency range, which considerably increases the audible noise level of the discharge when compared with that of the single torch discharge. On the positive side, as described above, the present inventors have found that when two (2) plasma torch modules are used together, the electrodes of the plasma torch modules are self-cleaning. That is, the dark deposits often found on plasma torches are greatly reduced or eliminated altogether. The present inventors believe that this self-cleaning advantage is the result of the current spikes (Recall FIG. 9B.) caused by surge voltages of the capacitors.

Figures 10, 11:
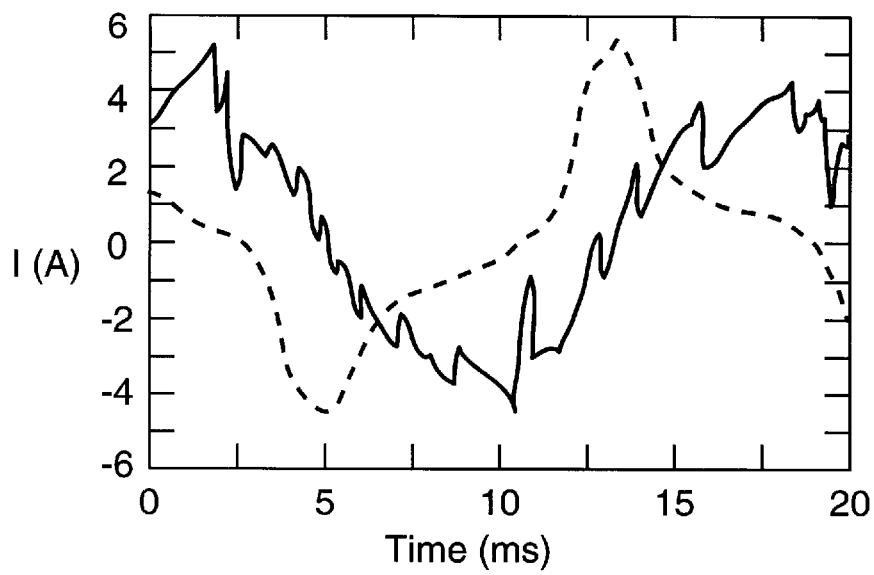
FIG. 10 is a plot of voltage and current waveforms of a transformer output when the two (2) plasma torches are powered by a circuit having a ballasting capacitor.
FIG. 11 is a table which summarizes power factors and powers of various plasma torch systems.

Having described the operation of a number of systems, the operating characteristics of each of these systems is summarized in the table of FIG. 11.

§ 4.4 CONCLUSIONS

Thus, the present invention discloses a new plasma torch module which may be constructed from parts of commercially available spark plugs. The plasma torch produced by such a module has a total volume of approximately 20 cc, with a height of at least 6 or 6.5 cm and a diameter of at least 1 cm. Further, the plasma torch has a peak plasma density exceeding $10^{13}$ electrons/cm$^3$. When two (2) plasma torch modules are operated by the same circuit, the power factor of the power line is improved to nearly one, the total harmonic distortion of the power line is reduced to a very low percentage and the electrodes of the plasma torch modules exhibit a self-cleaning characteristic. Further, the capacitively coupled plasma torch modules is an excellent self-adjusting resistive load to the power line since the ballasting capacitor(s) in the circuit work as dependent sources which keep the rapid variation part (i.e., spikes) of the discharge current of the torch modules as an internal circulation current. These spikes advantageously impart a self-cleaning characteristic to the plasma torch modules. The peak and average plasma density of the coupled plasma torch modules also increase over that of an uncoupled plasma torch module.

The annular magnet increases the density and the stability of plasma generated by the second embodiment of the plasma torch module. Thus, this module may be used to better ignite fuel, particularly when the fuel is passing the torch at high speeds and a stable and dense plasma torch is desired.

Since the plasma torch modules can be easily arranged on any surface, they can be used to absorb radiation (and therefore provide a cloaking feature), and reduce drag, such as wave drag for example, by weakening or eliminating sonic shock waves at supersonic speeds.

What is claimed is:

1. An apparatus for generating a plasma torch, the apparatus comprising:
   a) an anode;
   b) a cathode having at least one opening defined therethrough;
   c) an insulator arranged between the anode and the cathode, wherein a chamber is defined between the cathode and the insulator; and
   d) a plenum wall defining a plenum, wherein the plenum is fluidly coupled with the chamber via the at least one opening defined through the cathode.

2. The apparatus of claim 1 wherein the at least one opening defined through the cathode is a number of holes.

3. The apparatus of claim 1 wherein the at least one opening defined through the cathode is four holes.

4. The apparatus of claim 3 wherein the four holes are arranged in a spiral pattern.

5. The apparatus of claim 1 wherein the cathode is arranged radially outward of the insulator.

6. The apparatus of claim 1 further comprising:
   e) a surface plate; and
   f) a sealing washer arranged between the surface plate and the plenum wall,
      wherein the plenum is defined by the plenum wall, the sealing washer, and the cathode.

7. The apparatus of claim 1 wherein the plenum wall includes a gas inlet.

8. The apparatus of claim 1 wherein the anode is axially adjustable.

9. The apparatus of claim 1 further comprising:
   e) a set screw for setting an axial position of the anode.

10. The apparatus of claim 9 further comprising:
    f) a terminal cap electrically coupled with the anode,
       wherein the set screw is arranged within the terminal cap.

11. The apparatus of claim 1 wherein the anode is tungsten.

12. The apparatus of claim 1 wherein the anode is tungsten wire having a thickness of about 3/32 of an inch.

13. An apparatus of claim 1 wherein when a gas is introduced into the plenum and an electric potential, sufficient to cause an arc, is applied between the cathode and anode, a plasma torch is generated.

14. The apparatus of claim 13 wherein the plasma torch has a height of about 6 cm and a width of about 1 cm or more.

15. The apparatus of claim 13 wherein the plasma torch has a density of at least $10^{13}$ electrons/cm$^3$.

16. The apparatus of claim 1 further comprising:
   e) a capacitor having two terminals, a first terminal of the capacitor being coupled with the anode; and
   f) a transformer having a primary winding being coupled with a power supply input and a secondary winding, the secondary winding having a first terminal coupled with the cathode and a second terminal coupled with a second terminal of the capacitor.

17. The apparatus of claim 16 wherein the capacitor has a capacitance of approximately 1 μF.

18. The apparatus of claim 16 wherein the transformer has a turns ratio of approximately 1:25.

19. The apparatus of claim 1 wherein at least a part of the insulator coincides, axially, with at least a part of the anode.

20. The apparatus of claim 1 wherein the opening defined through the cathode extends in a substantially radial direction.

21. An apparatus for generating a plasma torch, the apparatus comprising:
   a) an anode;
   b) a cathode having at least one opening defined therethrough;
   c) an insulator arranged between the anode and the cathode, wherein a chamber is defined between the cathode and the insulator;
   d) a magnet positioned radially outward to, and spaced from, the cathode;
   e) a first body accommodating the magnet; and
   f) a second body,
      wherein the second body, the first body, and the magnet define a plenum, and
      wherein the plenum is fluidly coupled with the chamber via the at least one opening defined through the cathode.

22. The apparatus of claim 21 wherein the at least one opening defined through the cathode is a number of holes.

23. The apparatus of claim 21 wherein the at least one opening defined through the cathode is four holes.

24. The apparatus of claim 23 wherein the four holes are arranged in a spiral pattern.

25. The apparatus of claim 21 wherein the cathode is arranged radially outward of the insulator.

26. The apparatus of claim 21 wherein the magnet is a permanent magnet.

27. The apparatus of claim 26 wherein the permanent magnet has outside diameter of more than twice its inside diameter.

28. The apparatus of claim 26 wherein the permanent magnet has thickness of approximately half of its inside diameter.

29. The apparatus of claim 21 wherein the first body includes a gas inlet fluidly coupled with the plenum.

30. The apparatus of claim 21 wherein the anode is axially adjustable.

31. The apparatus of claim 1 further comprising:
   g) a set screw for setting an axial position of the anode.

32. The apparatus of claim 1 further comprising:
   h) a terminal cap electrically coupled with the anode,
      wherein the set screw is arranged within the terminal cap.

33. The apparatus of claim 1 wherein the anode is tungsten.

34. The apparatus of claim 21 wherein the anode is tungsten wire having a thickness of about 3/32 of an inch.

35. An apparatus of claim 21 wherein when a gas is introduced into the plenum and an electric potential, sufficient to cause an arc, is applied between the cathode and anode, a plasma torch is generated.

36. The apparatus of claim 35 wherein the plasma torch has a height of about 6 cm and a width of about 1 cm or more.

37. The apparatus of claim 35 wherein the plasma torch has a density of at least $10^{13}$ electrons/cm$^3$.

38. The apparatus of claim 21 further comprising:
   g) a capacitor having two terminals, a first terminal of the capacitor being coupled with the anode; and
   h) a transformer having a primary winding being coupled with a power supply input and a secondary winding, the secondary winding having a first terminal coupled with the cathode and a second terminal coupled with a second terminal of the capacitor.

39. The apparatus of claim 38 wherein the capacitor has a capacitance of approximately 1 μF.

40. The apparatus of claim 38 wherein the transformer has a turns ratio of approximately 1:25.

41. The apparatus of claim 21 wherein the second body is a plate.

42. The apparatus of claim 26 wherein at least a part of the magnet coincides, axially, with at least a part of the cathode.

* * * * *